US007597532B2

United States Patent
Gray et al.

(10) Patent No.: US 7,597,532 B2
(45) Date of Patent: Oct. 6, 2009

(54) SINGLE SIDED POWER GENERATOR SUPPORT FRAME

(75) Inventors: John E. Gray, Burlington, VT (US); Dean R. Corren, Burlington, VT (US)

(73) Assignee: Verdant Power, Inc., Arlington, VA (US)

( * ) Notice: Subject to any disclaimer, the term of this patent is extended or adjusted under 35 U.S.C. 154(b) by 201 days.

(21) Appl. No.: 11/429,268

(22) Filed: May 8, 2006

(65) Prior Publication Data

US 2006/0251510 A1 Nov. 9, 2006

Related U.S. Application Data

(60) Provisional application No. 60/678,189, filed on May 6, 2005.

(51) Int. Cl.
*F03B 13/12* (2006.01)

(52) U.S. Cl. .................. 415/4.2; 415/906; 415/907; 416/244 R; 416/DIG. 6

(58) Field of Classification Search .............. 415/4.2, 415/4.4, 126, 906, 907; 416/244 R, 246, 416/DIG. 6; 248/231.41, 294.11, 297.21, 248/297.215
See application file for complete search history.

(56) References Cited

U.S. PATENT DOCUMENTS

| 550,443 | A | * | 11/1895 | Deal | 108/146 |
| 2,144,719 | A | * | 1/1939 | Geffcken | 290/44 |
| 4,313,711 | A | * | 2/1982 | Lee | 415/7 |
| 4,613,279 | A | | 9/1986 | Corren et al. | |
| 6,406,221 | B1 | * | 6/2002 | Collier | 405/213 |
| 6,652,221 | B1 | * | 11/2003 | Praenkel | 415/3.1 |
| 7,215,039 | B2 | * | 5/2007 | Zambrano et al. | 290/55 |
| 2004/0070210 | A1 | | 4/2004 | Johansen et al. | |

* cited by examiner

*Primary Examiner*—Edward Look
*Assistant Examiner*—Nathaniel Wiehe
(74) *Attorney, Agent, or Firm*—Davidson Berquist Jackson & Gowdey LLP (57) ABSTRACT

A cantilevered power generation system and the support therefor comprising a clamping frame with first and second jaws that are relatively moveable and which permits the system to be mounted to a support located on or adjacent a shore line or water way so that power generation apparatus supported within the system can be positioned in the moving flow of water to generate power. The first and second jaws of the clamping frame support allows the power generation apparatus to be mounted adjacent a moving waterway and removed, as well as movable from one location to another and also allows the power generation apparatus to be raised thus permitting the repair and/or replacement of parts.

6 Claims, 9 Drawing Sheets

SINGLE SIDED POWER GENERATOR SUPPORT FRAME

CROSS-REFERENCE TO CO-PENDING APPLICATIONS

The present invention is related to and claims priority to the following co-pending U.S. Patent applications: U.S. Patent Application No. 60/678,189, entitled "Single-Sided Arm Rotor Support Frame" filed on May 6, 2005, which is commonly owned with the present application, the entire contents of which is incorporated herein by reference.

FIELD OF INVENTION

This invention relates to an energy conversion system and in particular to a unique mounting and support assembly for positioning and holding an energy conversion system, including at least one driven energy conversion device, within a source of moving water or other fluid. The mounting structure comprising a cantilevered support system for one or more driven devices, such as a vertically oriented rotor assembly, so that the driven device can be positioned in a moving stream of water or other fluid from a location adjacent a dock, a barge or any other support, whether newly constructed or an already existing structure, along the side or at the edge of a source of moving water or other fluid to which the mounting structure can be clamped. When installed, the fluid or water driven device, or devices if more than one is supported in the mounting structure, will be held within the moving water or fluid and be supported by the mounting structure so that the driven device or devices will be powered by the flowing water or other type of fluid flows, tidal flows or what ever is the source of moving fluid.

INTRODUCTION AND BACKGROUND

In the above-identified provisional patent application, a support mechanism was disclosed that permitted a vertically oriented, multi-bladed rotor assembly to be mounted within the frame, and on one side thereof, while the other side of the support frame permitted the frame to be mounted to a fixed or movable supporting structure adjacent a water channel, river or other such source of moving water.

As the need for more and a variety of alternative power generating systems rises, a renewed focus has been placed on the ability of hydropower as a source of power generation, and the use of moving water or fluid flows is a readily available source of power for driving devices placed in the flow so that generating electrical energy can take place in an efficient and effective manner. The sources of water power include all those where water or another fluid is moving, whether in rivers, tidal flows, within man-made channels, discharges from factories and other similar moving flows.

It is desirable that these power generation systems and approaches be as unobtrusive as possible, easily installed, by a type of mounting that permits easy repair or alteration of the mechanism being powered by the fluid flow, as well as the ability to move the location of the driven device. The mounting structure must also be secure, rugged, efficient, as inexpensive as possible and yet functional to the point of not obstructing fluid flow or other uses of the moving fluid or the fluid channel as well as being safe to install, to operate, to maintain, remove or move from one location to another.

The present invention achieves these objectives by using a mounting structure that can be mounted easily, permits the raising and lowering of the driven device, and also permits an easy and quick relocation of the driven device.

BRIEF DESCRIPTION OF THE DRAWINGS

The following description, given with respect to the attached drawings, may be better understood with reference to the non-limiting examples of the drawings, wherein.

DISCUSSION OF THE PREFERRED EMBODIMENTS

Figure 1:
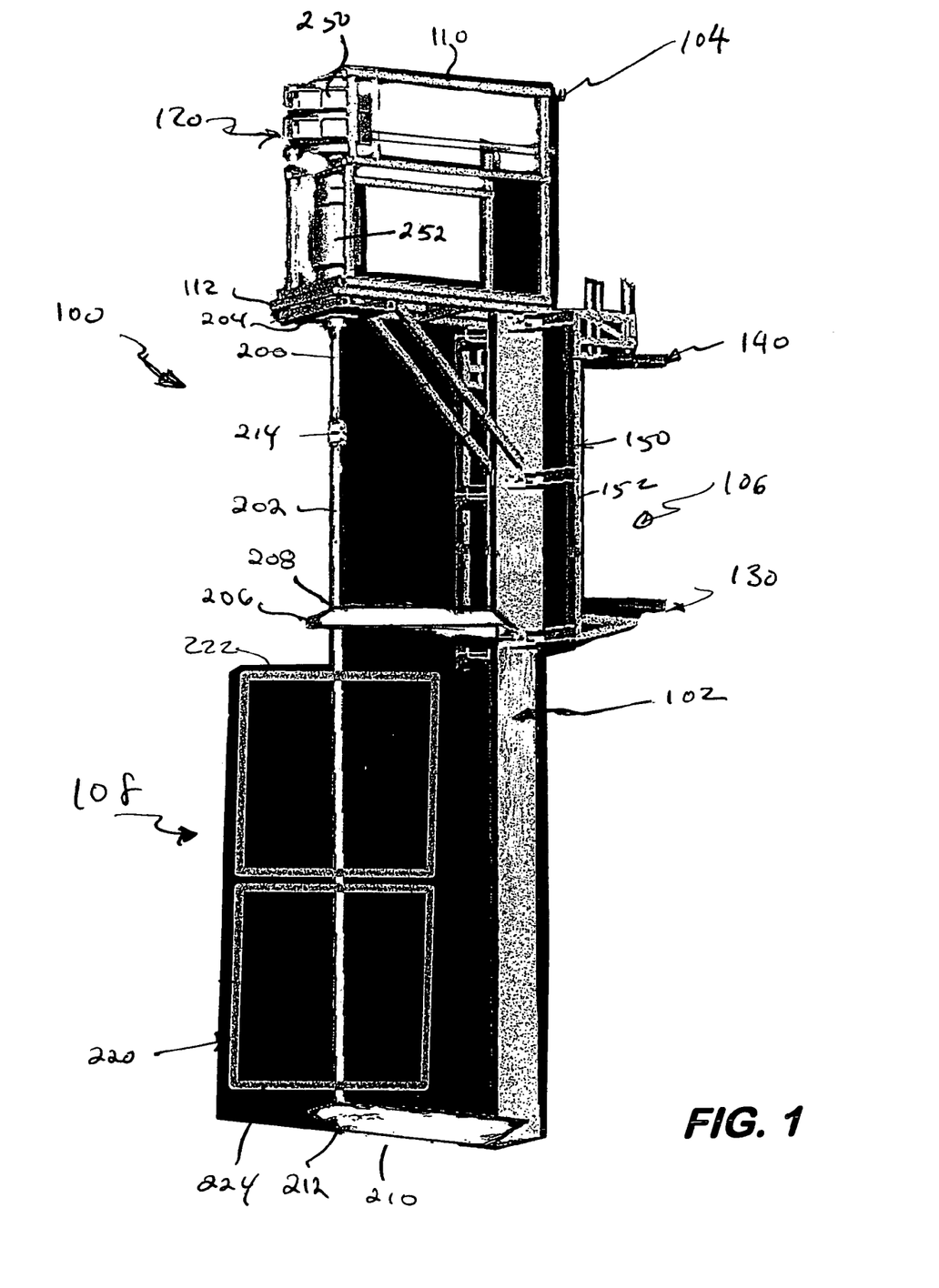
FIG. 1 is a front perspective view of the support frame together with the power generation system mounted in place.
Figure 2:
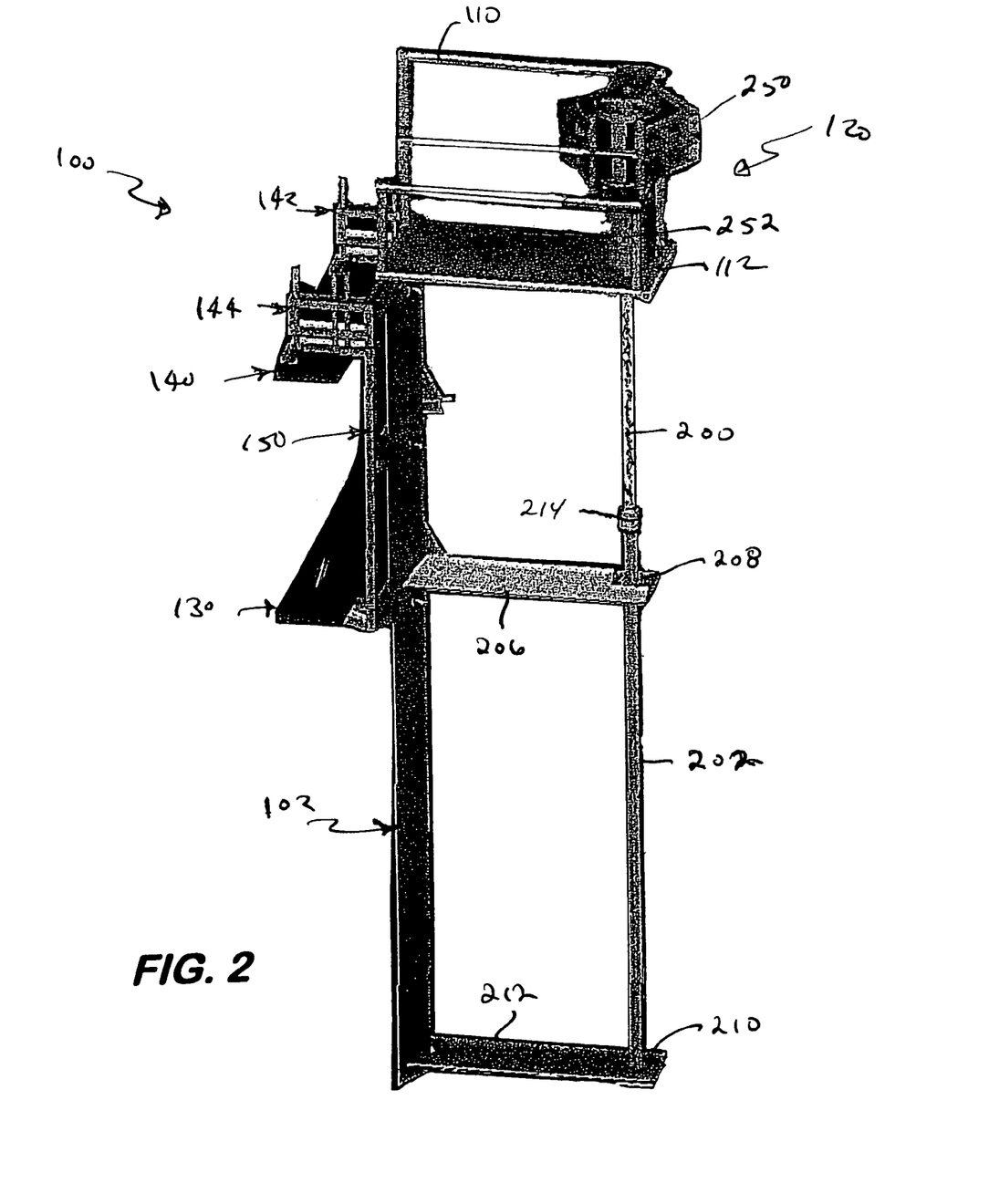
FIG. 2 is a front perspective of the support frame not including the power generation system.

Turning to FIG. 1, according to the present invention, the power generating and support assembly 100 includes a main vertical frame member 102 with an upper assembly 104, a clamp assembly 106, and a driven device support assembly 108.

The main vertical frame member 102 can preferably be formed from a beam, such as one having a triangular cross-section, but it should be understood that an H-shaped cross section, a faired, "hydrodynamic" shape or other cross-sectional shapes could be used as well. A triangular cross section is preferred since it is very strong in resisting bending moments, and the clamp assembly 106 can be easily connected to that shaped structure, and the flat side of the triangle can face toward the clamp assembly 106 so that the main vertical frame member 102 can slide vertically relative to the clamp assembly 106.

The upper assembly 104 is comprised of an outer guard rail system 110 that is mounted on a horizontal platform 112 which is itself, welded, bolted or otherwise attached to the top of the main vertical frame member 102, and a pair of angled braces 113 and 114 are welded between the bottom of platform 112 and the main vertical frame member 102 to provide additional support for platform 112. A power generating assembly 120 is mounted on platform 112 and will be discussed in more detail hereinafter.

Figure 4:
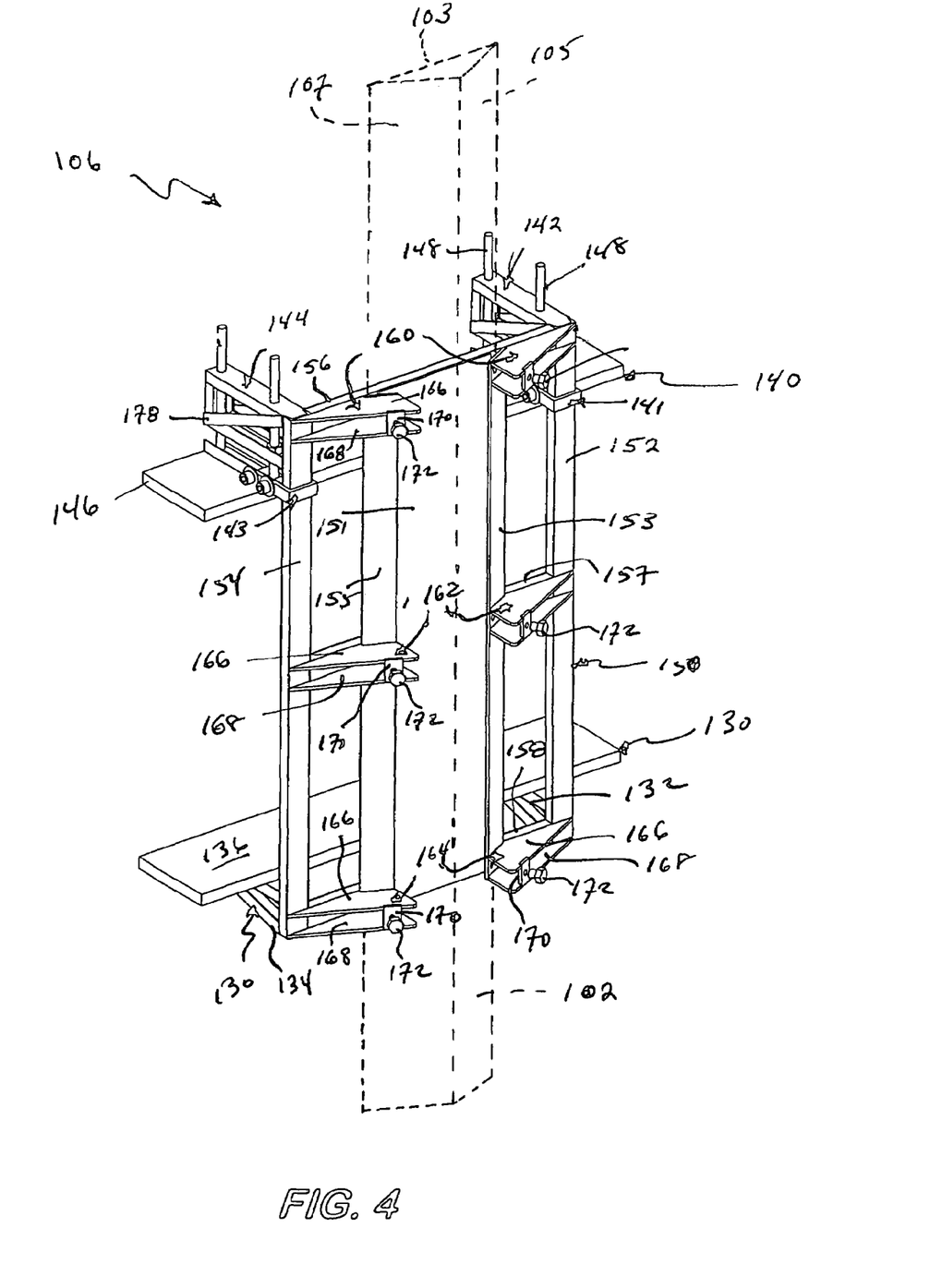
FIG. 4 is a perspective view of the clamp assembly.

The clamp assembly 106, as shown in FIG. 4, is slidably mounted to the main vertical support member 102 which is shown in phantom in FIG. 4. Clamp assembly 106 is comprised of a support frame 150 that includes a pair of outer vertical supports 152 and 154, two angled vertical supports 153 and 155, a vertically extending support plate 151, and three cross rails at the top, middle and bottom, 156, 157 and 158, respectively. These structures are preferably welded together and collectively comprise the main support structure for the clamp assembly 106.

The cross rails 156, 157 and 158 each support a pair of spaced apart clamping assemblies 160, 162 and 164, located on the rear side of the support frame, each of which includes a pair of spaced apart plates 166 and 168 that are welded or otherwise fixed to the three cross rails 156, 157 and 158 along a portion of their rear edges. The central most part of the rear edges of the plates 166 and 168 is angled outwardly away from the cross rails so that the angled supports 153 and 155 can be received thereagainst and be welded or otherwise fixed to each of the sets of plates 166 and 168, as shown in FIG. 4. Opposite the vertical plates 153 and 155 the outer edges of plates 166 and 168 are held apart by a vertical support plate 170, welded to each of the plates 166 and 168. The center of plate 170 includes a threaded hold, and a complimentary threaded hole is also provided in the adjacent vertical plate 153 and 155, so that a bolt 172 can be threadedly mounted there through and thus be able to extend beyond the inner surface of vertical plates 153 and 155.

As is shown, the main vertical frame member 102 has a triangular cross section and the flat side thereof 103 being positioned to face inwardly and against the vertically extending support plate 151. The front of the main vertical frame member 102 is defined by two angled faces 105 and 107. When slid into the support frame 150, the main vertical frame member 102 will be positioned so that the flat face 103 will be positioned against support plate 151, and the angled faces 105 and 107 will be located against and inside of angled plates 153 and 155. By tightening bolts 172, which extend through the angled supports 153 and 155 the main vertical frame member 102 will be tightly held within the support frame 150. However, should it be desired to readjust the support frame 150 relative to the main vertical frame member 102, bolts 172 can be loosened to release the holding force they provide and the support frame can then be moved vertically along the main vertical frame member 102 Movement of the main vertical frame member 102 can be accomplished in a number of ways, including by use of a crane that will be attached to the top of the main vertical frame member 102 so that once bolts 172 are loosened the crane can then either raise or lower the main vertical frame member 102 as is desired. It should also be understood that the main vertical frame member 102 can be raised or lowered manually, for example by a crank mechanism, or by a suitable motor or other drive mechanism (not shown), which could drive, for example, a geared hydraulic, or cable drive mechanism (not shown) attached to the main vertical frame member 102, all of which can be attached to the support frame 150 as one skilled in the art will understand.

Clamp assembly 106 is also comprised of a bottom section 130 and an upper section 140.

The bottom section 130 includes a pair of braces 132 and 134 that are welded or otherwise attached to the vertical supports 152 and 154, respectively and to the bottom cross rail 158. Braces 132 and 134 support and are attached to a horizontally extending lower clamp member 136 that can be formed from a variety of materials, including wood, steel, concrete, a reinforced resin, plastic or a composite structure, or a combination of these types of materials. Because the braces 132 and 134 are welded or fixed in place the bottom section is fixed in place on supporting frame 150.

The upper section 140 includes a pair of braces 142 and 144 that are, in part, slidingly connected to the vertical supports 152 and 154, respectively, by retaining members 141 and 143, respectively, and are also in part fixed in place. Braces 142 and 144 movably hold a horizontally extending upper clamp member 146 that like the lower clamp member 136 can be formed from a variety of materials, including wood, steel concrete or a reinforced resin or plastic material. What is important is that the horizontally extending upper clamp member 146 be stiff and strong enough to support the weight of the support assembly 100.

Figure 5:
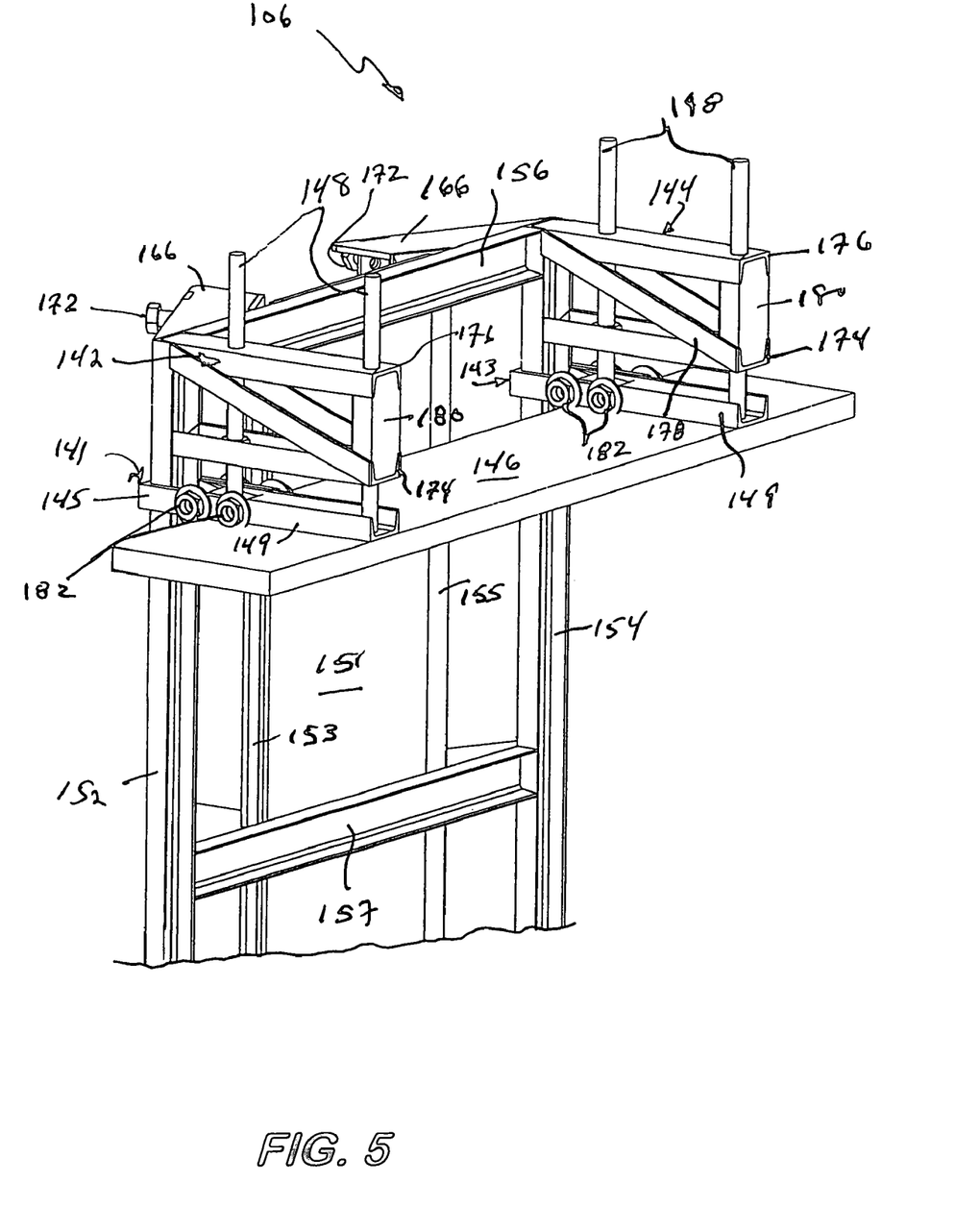
FIG. 5 is an enlarged portion of a perspective view of the clamping assembly from the opposite side of that shown in FIG. 4.

The upper section 140 includes an adjustment assembly that provides the ability to adjust the position of horizontally extending upper clamp member 146. The upper part of each brace 142 and 144 is comprised of two opposing channel members 174 and 176 that are welded to the vertical supports 152 and 154, respectively. In addition, angled braces 178 are provided on each side of these channel members 174 and 176 and are welded thereto for additional support. Further, a front support block 180 is welded between and to the outer ends of channel members 174 and 176. The horizontally extending upper clamp member 146 is itself bolted or otherwise fixed to a channel shaped member 149 that is moveably retained on the braces 142 and 144 by a pair of threaded rods 148 that threadedly pass through each of the channel members 174 and 176 and into suitable rotational bearings mounted on the inside of channel member 149 (not shown). In addition, each of the retaining members 141 and 143 are comprised of a U-shaped strap with the leg portions thereof 145 extending around the vertical supports 152 and 154 and over the exterior of channel member 149 where they are held in place by being bolted by a pair of bolts 182. Bolts 182 pass through each side of the U-shaped leg portions and through channel member 149 so that when tightened bolts 182 hold the retaining members 141 and 143 in a fixed position relative to the vertical supports 152 and 154. When bolts 182 are loosened, the U-shaped straps will slide along the vertical supports 152 and 154 and guide the adjusting movement of the horizontally extending upper clamp member 146.

Figure 6:
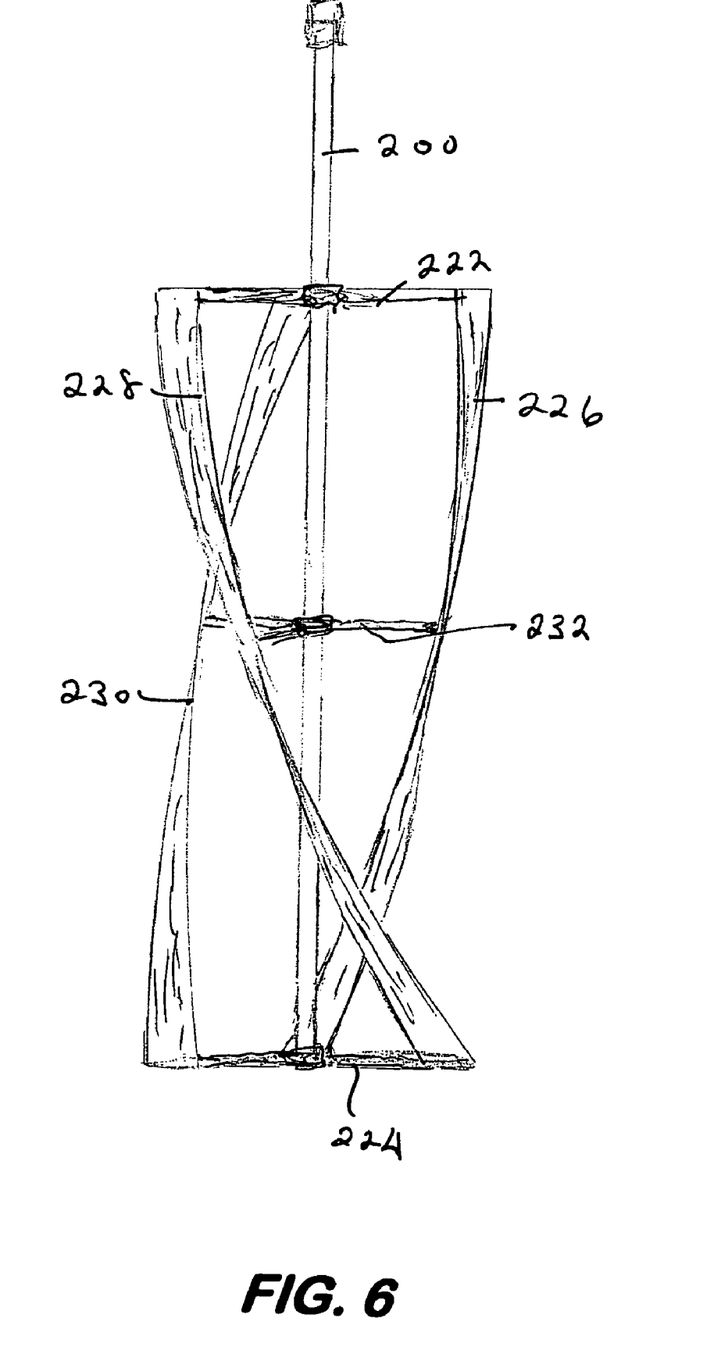
FIG. 6 is a diagrammatic view of one embodiment of a rotor assembly.

A rotor shaft having a upper section 200 and a lower section 202 extends from the upper support bearing 204, mounted beneath the platform 112, downwardly through a cantilevered mid-level support 206, and a suitable rotational coupling or bearing 208 to the bottom cantilevered support 210 and a suitable bearing 212, such as, for example, a water-wetted acetal (e.g. "Delrin"™) material mounted on stainless steel. Each of the bottom and mid-level cantilevered supports, 206 and 210 preferably have a triangular cross-sectional shape with the flat side facing up on the bottom support 210 and facing down on the mid-level support 206. This permits the use of a conveniently flat bearing mounting surface while maintaining a hydrodynamically unobtrusive shape, using simple plate fabrication. The top end of rotor shaft 200 is operatively connected with the power generating assembly 120. The lower rotor shaft section 202 that extends between the mid-level support 206 and the bottom support 210 passes through and supports a vertically oriented rotor 220. Rotor 220 includes, for example of one type of rotor comprised of an upper support hub 222, a lower support hub 224 and a series of rotor blades 226, 228 and 230 that extend in a curved manner between the upper and lower sprockets 222 and 224, respectively. If desired, an additional support sprocket 232 can be positioned mid-way along the length of the rotor blades and connected as well to the rotor shaft 200. A shaft coupling 214 can be provided to couple one size or shape shaft to another as well as to permit the shaft 200 to be removed or replaced with a different type or size of rotor structure.

Figure 7:
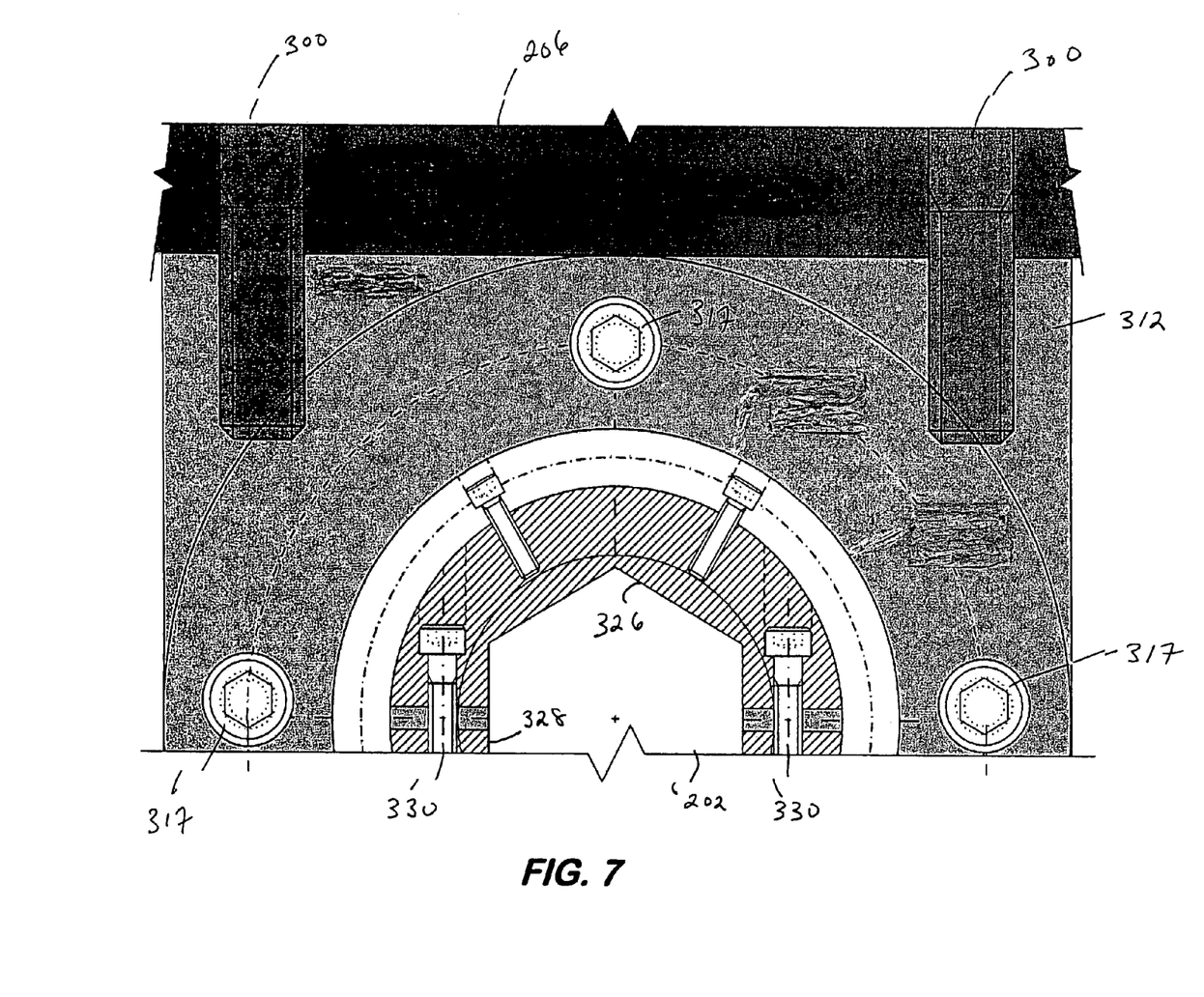
FIG. 7 is a partial cross-sectional view through a rotor bearing.
Figure 8:
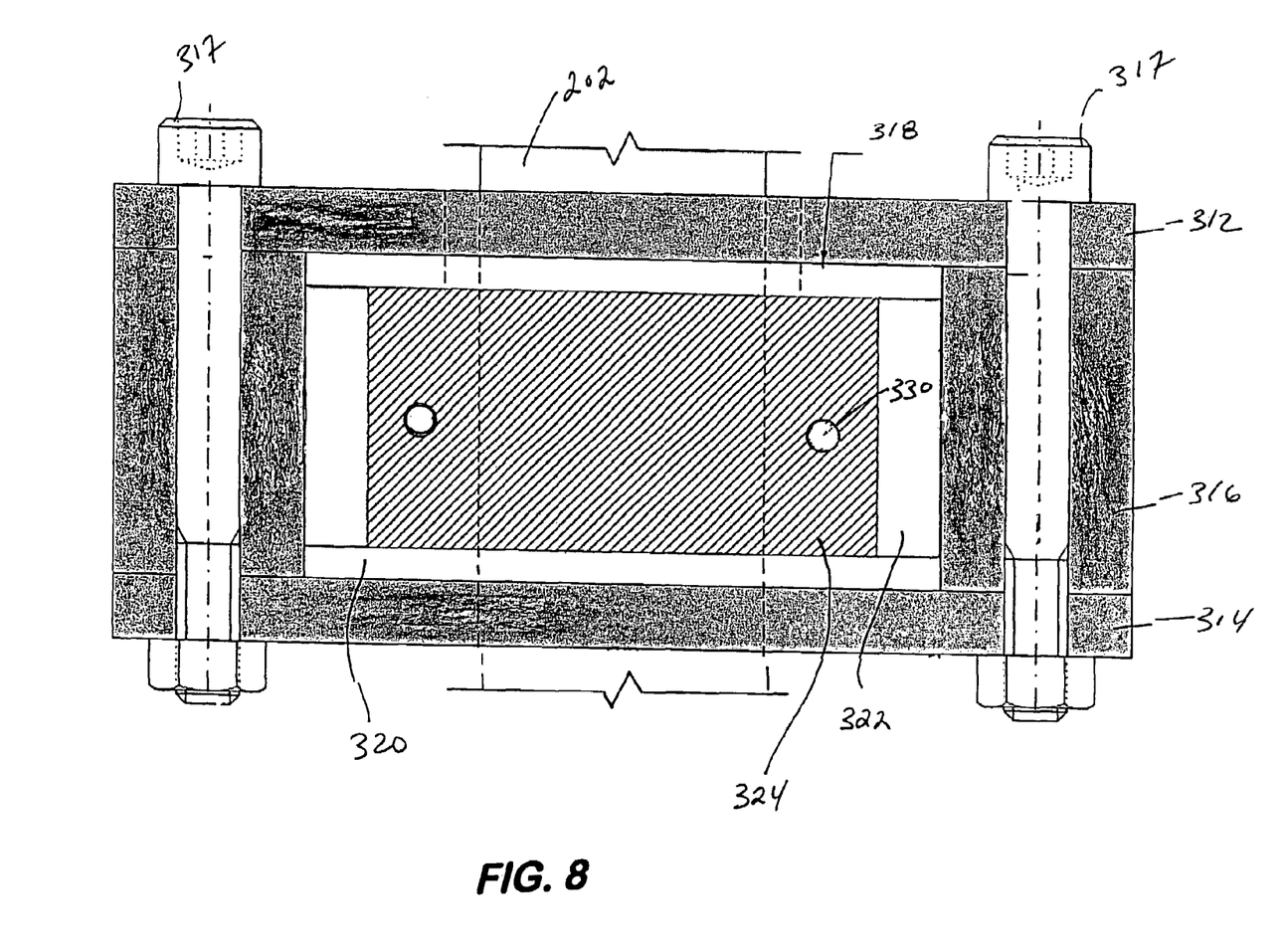
FIG. 8 is an elevational cross-sectional view looking at the rotor bearing of FIG. 7.

FIGS. 7 and 8 show an exemplary rotor bearing 208 mounted to support 206 by bolts 300 that connect into a block or carrier 310 formed of top and bottom plates 312 and 314, respectively, that are suitably connected to a central collar or ring 316 by bolts 317. Upper and lower Acetal thrust bearings 318 and 320 are positioned, respectively, beneath the top plate 312 and above the bottom plate 314 and are bounded by an Acetal radial bushing 322. The shaft 202 is clamped by a shaft clamp 324 comprised of two halves 326 and 328 that are held around shaft 202 by bolts 330. thus, the shaft and clamp 324 rotate within the Acetal bushings and thrust bearings 318, 320 and 322, collectively within the carrier structure.

The present invention could also use the support assembly to mount other types of devices that could be driven by moving water including cross-flow turbines, propeller generators (shown in phantom at 209), as well as other forms of energy conversion equipment that could be driven by flowing fluids, including water. Like rotor 220, these other energy converting devices, two of which are shown in phantom at 240 and 242 in FIG. 3, would be mounted between the cantilevered support members 206 and 212 (shown in phantom at 211). It is also contemplated that one or several of such devices could be mounted, one above the other, as is diagrammatically shown in FIG. 3 at 240 and 242, respectively, with the exact number of driven devices being limited only by the size or diameter of the particular devices, the length of each of the cantilevered supports 206 and 212, and the distance between cantilevered supports 206 and 212.

The power generating assembly 120 includes a generator assembly 250 and a gear assembly 252 positioned between the shaft 200 and the generator 250. Rotor shaft 200 is operatively connected with the gear assembly 252 so that as rotor 108 is moved by water or another fluid flow, shafts 202 and 200 will be turned thereby driving the power generator 250.

A suitable gear assembly is a model 13-V-3-43 manufactured by Cone Drive and a suitable generator would be an Ecycle MG3-36 Silicon Series three-stack 3-phase 15 kW permanent magnet motor/generator. A diode bridge rectifier was used to produce DC current for its loadbank. Another suitable generator would be a 5 kW Ecycle CMG-13 Silicon Series single-stack motor-generators. A Hall-effect rotor position sensor board was installed in the rear cover and is used for the motor driver used for starting the rotor.

Figure 3:
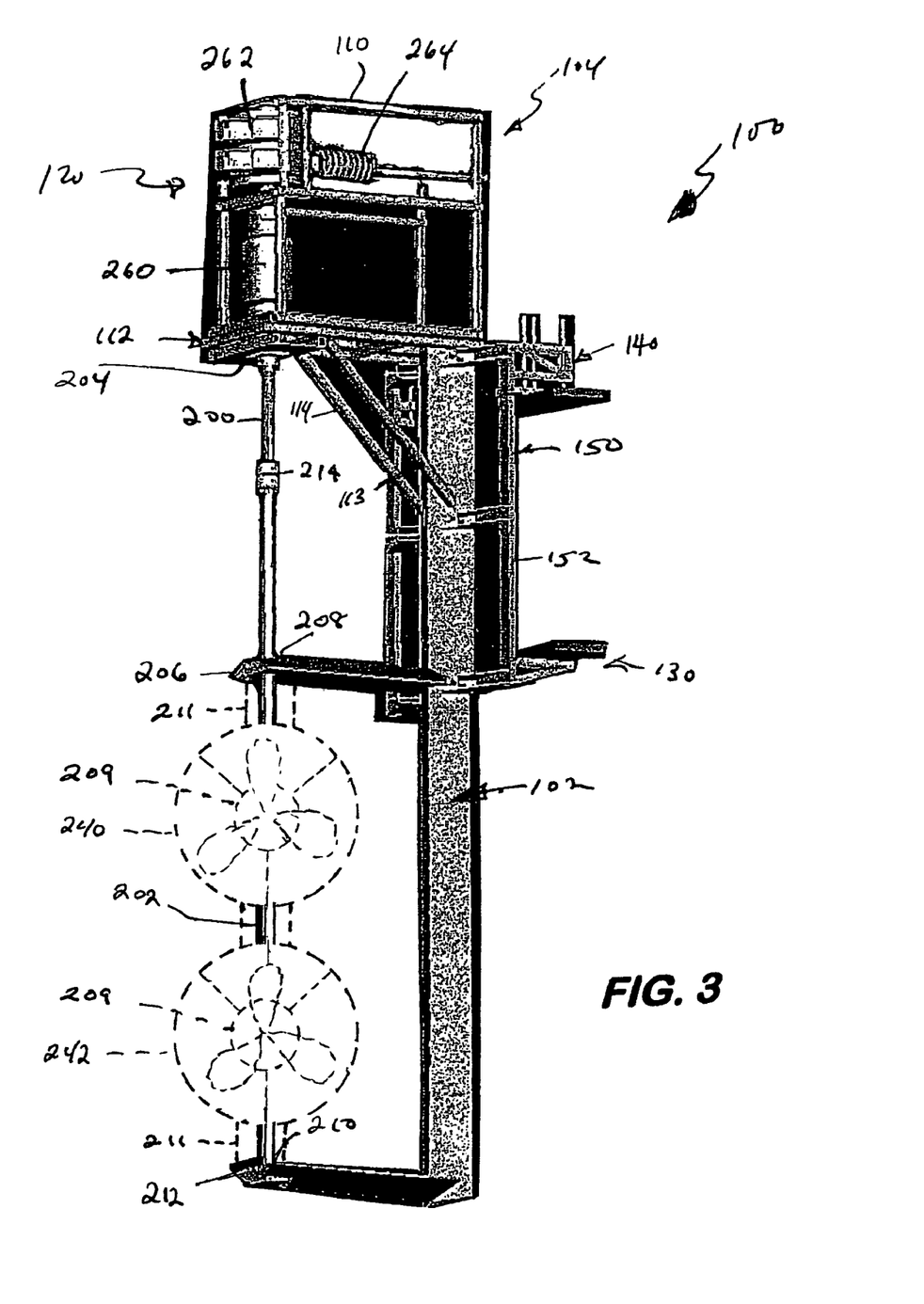
FIG. 3 is a perspective view of the mounting clamp mounting a plurality of optional driven devices.

In addition to this assembly being used with a power generating system, it can also be used with a dynamometer to test potential rotor movement and available torque from a particular water or fluid flow environment. In this case, as shown in FIG. 3, a torque sensor 252, a dynamometer 262, as well as a brake assembly 250 can be mounted on platform 119. The torque sensor 260 includes strain gages. A typical torque sensor is one made by Himmelstein, model 29007 rotating load cell. A suitable brake assembly 264, provides the ability to variably and continuously load the rotor shaft 200 and rotor 220 from a no-load condition to a locked condition so that the waterspeed, rotor torque, and rotor angular velocity can be measured simultaneously for a wide range of loadings for each of a wide range of water speeds. The power of the turbine, $P_T$, is the product of torque, $\tau$, and angular velocity, $\Omega (P=\tau\Omega)$.

The length of the main vertical frame member 102 depends on the depth or width of available water resource. but can vary in length from about 2 ft to about 40 ft. in length These lengths would result in an opening between the cantilevered supports 206 and 212 that would again depend on factors such as the rotor size, max water speed and how many arms are desired, but could range from about 2 ft. to about 20 ft. The main vertical frame member 102 has a flat side width of about 6 inches to about 60 feet. The clamping assembly has an opening between the upper and bottom sections 130 and 140 that can be sized to fit the specific dock, support or other mounting structure to be used and can vary from five inches to 10 feet or more, with the preferred opening being about 4 feet.

The vertically or horizontally oriented rotor 220 can be about 2-30 feet in vertical height and can have a diameter of about 3 feet. To date the rotor tested had a diameter of about 1 meter and 2.5 meters in length, and could be mounted either vertically or horizontally. Other types of rotors or cross-flow turbine assemblies could also be used and could have diameter that varied from about 1 foot to about 20 ft. The dimensions for other power generating devices that could be mounted in the support frame, and between the cantilevered supports 206 and 212 could be as sized between 6 inches and 60 feet depending upon the particular installation and the depth of the water way and the size of the frame.

The power output of the rotor can be determined by dynamometry. Table 1 sets forth typical power generation from a series of rotor sizes and types:

| Summary GHT Performance ||||||||||||
| No Load ||| Practical Peak Power Points ||||||| Stall ||
| Waterspeed m/s | Omega rad/s | Omega rpm | X X = WR/V | Omega rad/s | Power Watts | Torque Nm | Omega rpm | X | $P_{water}$ Watts | Cp % | estimate rpm | Waterspeed m/s |
|---|---|---|---|---|---|---|---|---|---|---|---|---|
| 1.50 | 9.72 | 92.8 | 3.24 | 7.0 | 783 | 111.8 | 67 | 2.33 | 4219 | 18.6 | 64.9 | 1.50 |
| 1.48 | 9.42 | 90.0 | 3.18 | 6.8 | 841 | 123.7 | 65 | 2.30 | 4052 | 20.8 | 64.0 | 1.48 |
| 1.46 | 9.40 | 89.8 | 3.22 | 6.7 | 847 | 126.5 | 64 | 2.29 | 3890 | 21.8 | 62.1 | 1.46 |
| 1.44 | 9.55 | 91.2 | 3.32 | 6.7 | 847 | 126.5 | 64 | 2.33 | 3732 | 22.7 | 62.1 | 1.44 |
| 1.42 | 9.31 | 88.9 | 3.28 | 6.5 | 814 | 125.3 | 62 | 2.29 | 3579 | 22.8 | 60.2 | 1.42 |
| 1.40 | 9.09 | 86.8 | 3.25 | 6.4 | 788 | 123.1 | 61 | 2.29 | 3430 | 23.0 | 58.3 | 1.40 |
| 1.38 | 9.17 | 87.5 | 3.32 | 5.9 | 843 | 142.9 | 56 | 2.14 | 3285 | 25.7 | 54.4 | 1.38 |
| 1.36 | 9.10 | 86.9 | 3.35 | 5.7 | 845 | 148.2 | 54 | 2.10 | 3144 | 26.9 | 53.5 | 1.36 |
| 1.34 | 8.98 | 85.7 | 3.35 | 5.7 | 846 | 148.4 | 54 | 2.13 | 3008 | 28.1 | 53.5 | 1.34 |
| 1.32 | 8.80 | 84.1 | 3.33 | 5.5 | 804 | 146.1 | 53 | 2.08 | 2875 | 27.9 | 50.6 | 1.32 |
| 1.30 | 8.81 | 84.1 | 3.39 | 5.7 | 746 | 130.9 | 54 | 2.19 | 2746 | 27.2 | 53.5 | 1.30 |
| 1.28 | 8.66 | 82.7 | 3.38 | 5.5 | 712 | 129.4 | 53 | 2.15 | 2621 | 27.2 | 49.7 | 1.28 |
| 1.26 | 8.53 | 81.5 | 3.39 | 5.5 | 692 | 125.8 | 53 | 2.18 | 2500 | 27.7 | 48.7 | 1.26 |
| 1.24 | 8.51 | 81.3 | 3.43 | 5.3 | 666 | 125.7 | 51 | 2.14 | 2383 | 28.0 | 48.7 | 1.24 |
| 1.22 | 8.38 | 80.1 | 3.44 | 5.3 | 623 | 117.5 | 51 | 2.17 | 2270 | 27.4 | 48.7 | 1.22 |
| 1.20 | 8.31 | 79.3 | 3.46 | 5.2 | 584 | 112.4 | 50 | 2.17 | 2160 | 27.1 | 47.7 | 1.20 |
| 1.18 | 8.36 | 79.8 | 3.54 | 5.0 | 546 | 109.3 | 48 | 2.12 | 2054 | 26.6 | 46.8 | 1.18 |
| 1.16 | 8.25 | 78.8 | 3.56 | 4.9 | 505 | 103.1 | 47 | 2.11 | 1951 | 25.9 | 45.8 | 1.16 |
| 1.14 | 7.72 | 73.8 | 3.39 | 4.7 | 501 | 106.6 | 45 | 2.06 | 1852 | 27.1 | 43.9 | 1.14 |
| 1.12 | 7.57 | 72.3 | 3.38 | 4.7 | 457 | 97.3 | 45 | 2.10 | 1756 | 26.0 | 43.9 | 1.12 |
| 1.10 | 7.51 | 71.7 | 3.41 | 4.7 | 379 | 80.6 | 45 | 2.14 | 1664 | 22.8 | 42.0 | 1.10 |
| 1.08 | 7.30 | 69.7 | 3.38 | 4.8 | 349 | 72.6 | 46 | 2.22 | 1575 | 22.1 | 41.1 | 1.08 |

-continued

Summary GHT Performance

| | No Load | | | Practical Peak Power Points | | | | | | | Stall | |
|---|---|---|---|---|---|---|---|---|---|---|---|---|
| Waterspeed m/s | Omega rad/s | Omega rpm | X<br>X = WR/V | Omega rad/s | Power Watts | Torque Nm | Omega rpm | X | $P_{water}$ Watts | Cp % | estimate rpm | Waterspeed m/s |
| 1.06 | 7.08 | 67.6 | 3.34 | 4.6 | 337 | 73.2 | 44 | 2.17 | 1489 | 22.6 | 40.1 | 1.06 |
| 1.04 | 7.00 | 66.8 | 3.36 | 4.5 | 305 | 67.7 | 43 | 2.16 | 1406 | 21.7 | 37.2 | 1.04 |
| 1.02 | 6.99 | 66.8 | 3.43 | 4.5 | 272 | 60.4 | 43 | 2.21 | 1327 | 20.5 | 34.4 | 1.02 |
| 1.00 | 6.84 | 65.3 | 3.42 | 4.4 | 259 | 58.8 | 42 | 2.20 | 1250 | 20.7 | 34.4 | 1.00 |
| 0.98 | 6.64 | 63.5 | 3.39 | 4.4 | 244 | 55.5 | 42 | 2.24 | 1176 | 20.7 | 32.5 | 0.98 |
| 0.96 | 6.58 | 62.8 | 3.43 | 4.2 | 230 | 54.7 | 40 | 2.19 | 1106 | 20.8 | 31.5 | 0.96 |
| 0.94 | 6.51 | 62.2 | 3.46 | 4.0 | 219 | 54.7 | 38 | 2.13 | 1038 | 21.1 | 31.5 | 0.94 |
| 0.92 | 6.33 | 60.4 | 3.44 | 4.0 | 210 | 52.6 | 38 | 2.17 | 973 | 21.6 | 34.4 | 0.92 |
| 0.90 | 6.05 | 57.7 | 3.36 | 4.1 | 208 | 50.8 | 39 | 2.28 | 911 | 22.9 | 30.6 | 0.90 |
| 0.88 | 5.96 | 57.0 | 3.39 | 4.0 | 195 | 48.8 | 38 | 2.27 | 852 | 22.9 | 28.6 | 0.88 |
| 0.86 | 5.97 | 57.0 | 3.47 | 3.9 | 181 | 46.3 | 37 | 2.27 | 795 | 22.7 | 29.6 | 0.86 |
| 0.84 | 5.84 | 55.8 | 3.48 | 3.9 | 173 | 44.4 | 37 | 2.32 | 741 | 23.4 | 27.7 | 0.84 |
| 0.82 | 5.71 | 54.5 | 3.48 | 3.8 | 165 | 43.3 | 36 | 2.32 | 689 | 23.9 | 26.7 | 0.82 |
| 0.80 | 5.64 | 53.8 | 3.52 | 3.6 | 159 | 44.2 | 34 | 2.25 | 640 | 24.9 | 26.7 | 0.80 |
| 0.78 | 5.52 | 52.8 | 3.54 | 3.5 | 155 | 44.3 | 33 | 2.24 | 593 | 26.1 | 26.7 | 0.78 |
| 0.76 | 5.45 | 52.0 | 3.58 | 3.3 | 152 | 46.2 | 32 | 2.17 | 549 | 27.8 | 27.7 | 0.76 |
| 0.74 | 5.39 | 51.4 | 3.64 | 3.3 | 154 | 46.8 | 32 | 2.23 | 507 | 30.5 | 28.6 | 0.74 |
| 0.72 | 5.34 | 51.0 | 3.71 | 3.3 | 158 | 47.9 | 32 | 2.29 | 467 | 33.9 | 28.6 | 0.72 |
| 0.70 | 5.30 | 50.6 | 3.79 | 3.3 | 152 | 46.2 | 32 | 2.36 | 429 | 35.5 | 27.7 | 0.70 |
| 0.68 | 5.20 | 49.7 | 3.82 | 3.4 | 144 | 42.5 | 32 | 2.50 | 393 | 36.7 | 27.7 | 0.68 |
| 0.66 | 5.27 | 50.4 | 4.00 | 3.1 | 139 | 44.9 | 30 | 2.35 | 359 | 38.8 | 27.7 | 0.66 |

Figure 9:
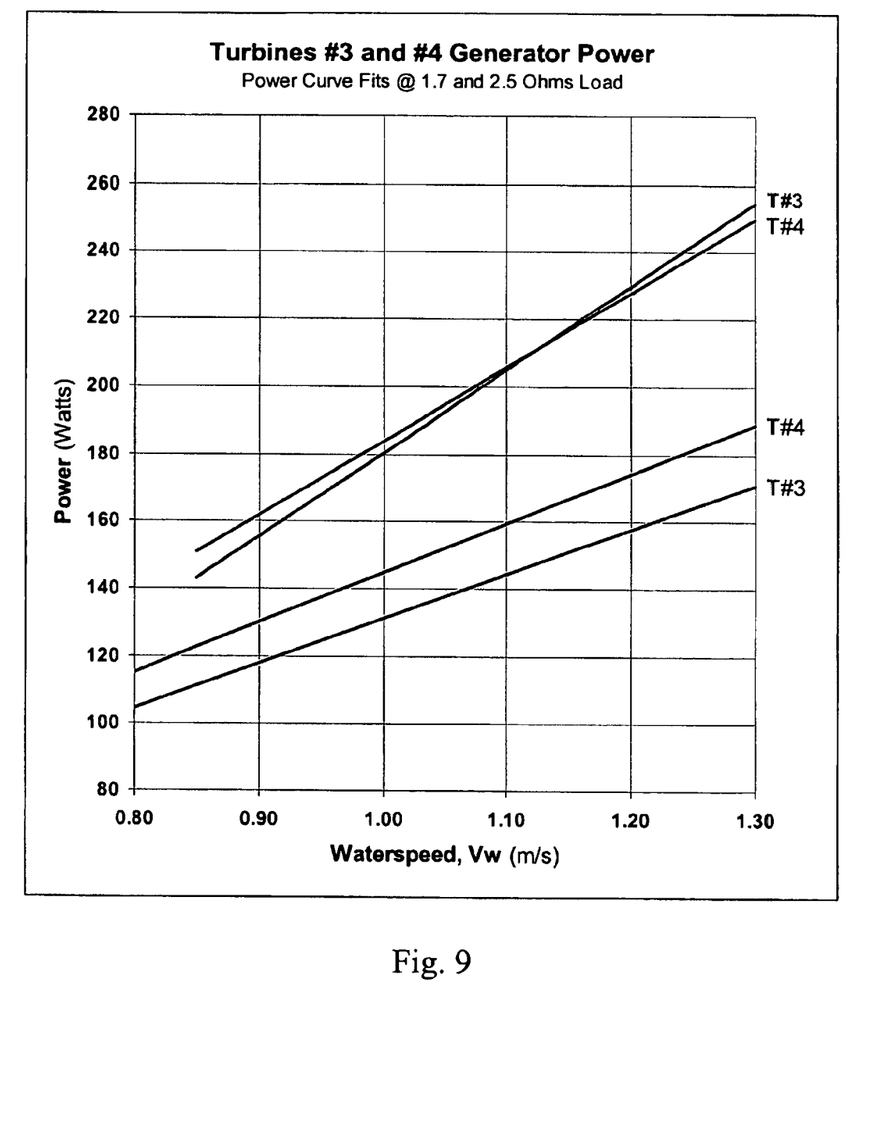
FIG. 9 is a graph of power production.

The amount of power being produced is summarized in FIG. 9:

While certain configurations of structures have been illustrated for the purposes of presenting the basic structures of the present invention, one of ordinary skill in the art will appreciate that other variations are possible which would still fall within the scope of the appended claims.

We claim:

1. A power generating system including a support structure for supporting the power generation system adjacent a waterway through which water flows comprising a clamping frame having a clamping side and a support side the clamping side including vertically adjustable opposing jaw members so that the clamping frame can be clamped onto a structure by the operation of the opposing jaw members and adjustably located adjacent or at one side of the waterway, a support member slidingly mounted to said clamping frame on the support side thereof, a set of cantilevered support members attached to and extending from said support member and away from the clamping frame, said clamping frame including a pair of clamping jaws on the clamping side thereof that are movable one relative to the other and a power generation assembly operatively connected to the support structure and including a power generating device having a driven portion operatively positionable in the flowing water and moved by the flow thereof to drive the power generating device to thereby generate electricity.

2. The support structure as in claim 1 further including a platform mounted to the upper portion of the support member.

3. The support structure as in claim 1 wherein the support member has a triangular cross-sectional shape.

4. The support structure as in claim 1 wherein the slide mounting for the support member comprises a set of retaining members each including a locking device that will lock and release the support member to the clamping frame.

5. The support structure as in claim 4 wherein the set of retaining members includes three pairs of retaining members located on the clamping frame in a manner such that they are spaced apart both vertically and horizontally.

6. A cantilevered power generation system for use with moving waterways comprising a clamping frame having opposed jaw assemblies that are vertically adjustable one to another on one side thereof a vertical support member slidingly mounted to said clamping frame on a side opposite to the jaw assemblies, a set of cantilevered support members attached to and extending from said vertical support member in a direction opposed to the clamping frame, a power generation assembly attached to the vertical support member, and at least one driven member operatively supported by the cantilevered support members and connected to the power generation assembly so that the at least one driven member will be adjustably positioned in and moved by fluid flow within the waterway so as to drive the power generation assembly wherein the vertical support member is vertically adjustable relative to the clamping frame.

* * * * *